United States Patent [19]

Reiff et al.

[11] Patent Number: 4,472,550

[45] Date of Patent: Sep. 18, 1984

[54] EMULSIFIERS, AQUEOUS ISOCYANATE EMULSIONS CONTAINING THEM AND THEIR USE AS BINDERS IN A PROCESS FOR THE MANUFACTURE OF MOLDED ARTICLES

[75] Inventors: Helmut Reiff, Leverkusen; Hanns I. Sachs, Cologne, both of Fed. Rep. of Germany

[73] Assignee: Bayer Aktiengesellschaft, Leverkusen, Fed. Rep. of Germany

[21] Appl. No.: 456,191

[22] Filed: Jan. 7, 1983

Related U.S. Application Data

[62] Division of Ser. No. 150,487, May 16, 1980, Pat. No. 4,413,112.

[30] Foreign Application Priority Data

May 29, 1979 [DE] Fed. Rep. of Germany ....... 2921681

[51] Int. Cl.$^3$ .............................................. C08L 75/04
[52] U.S. Cl. .................................... 524/589; 252/302; 524/107; 524/198; 524/199; 524/200; 524/591
[58] Field of Search ............... 524/591, 107, 198, 199, 524/200, 589; 252/302, 351, 357

[56] References Cited

U.S. PATENT DOCUMENTS

| | | | |
|---|---|---|---|
| 2,593,112 | 4/1952 | Cross et al. | 568/608 |
| 2,946,767 | 7/1960 | Gassman | 528/73 |
| 3,317,481 | 5/1967 | Youker | 260/77.5 |
| 3,457,203 | 7/1969 | Cohen et al. | 528/78 |
| 3,580,869 | 5/1971 | Rhodes, Jr. | 528/78 |
| 3,839,413 | 10/1974 | Wolff | 528/79 |
| 3,996,154 | 12/1976 | Johnson et al. | 252/312 |
| 4,164,535 | 8/1979 | Veaute | 264/136 |

FOREIGN PATENT DOCUMENTS

| | | |
|---|---|---|
| 1492507 | 5/1969 | Fed. Rep. of Germany . |
| 1653177 | 11/1970 | Fed. Rep. of Germany . |
| 2711958 | 3/1977 | Fed. Rep. of Germany . |
| 2703271 | 8/1978 | Fed. Rep. of Germany . |
| 2724363 | 11/1978 | Fed. Rep. of Germany . |
| 2724364 | 12/1978 | Fed. Rep. of Germany . |
| 1157828 | 10/1956 | France . |
| 1417618 | 4/1973 | United Kingdom . |
| 1523601 | 9/1978 | United Kingdom . |

*Primary Examiner*—Theodore E. Pertilla
*Attorney, Agent, or Firm*—Gene Harsh; Joseph C. Gil

[57] ABSTRACT

This invention relates to new emulsifiers for aqueous isocyanate emulsions and to their use as binders in the production of molded articles, in particular plates, e.g., from materials containing lignocellulose.

12 Claims, No Drawings

EMULSIFIERS, AQUEOUS ISOCYANATE EMULSIONS CONTAINING THEM AND THEIR USE AS BINDERS IN A PROCESS FOR THE MANUFACTURE OF MOLDED ARTICLES

This application is a division of application Ser. No. 150,487, filed May 16, 1980, now U.S. Pat. No. 4,413,112 issued Nov. 1, 1983.

FIELD OF THE INVENTION

This invention relates to new emulsifiers for aqueous isocyanate emulsions and to their use as binders in the production of molded articles, in particular, plates, e.g., from materials containing lignocellulose.

Molded materials such as chipboard, composite board or the like are generally produced by molding the inorganic or organic raw material, e.g., a mass of wood shavings, wood fiber or other material containing lignocellulose, with binders such as solutions of aqueous dispersions of urea/formaldehyde or phenol/formaldehyde resins under heat and pressure. It is also known to use isocyanate solutions instead of urea/formaldehyde or phenol/formaldehyde resins as binders for molded boards (German Auslegeschrift No. 1,271,984, German Offenlegungsschriften Nos. 1,492,507 and 1,653,177).

A process for the production of board or other molded articles has been disclosed which consists of hot-pressing a mixture of lignocellulose material using an aqueous emulsion of an organic polyisocyanate as binder (German Offenlegungsschriften Nos. 2,610,552; 2,703,271; 2,724,363; and 2,724,364).

These aqueous emulsions, however, react too rapidly with water producing carbon dioxide and polyureas. Because of this, additives which render them hydrophobic are generally added. These additives are either inert diluents such as chlorinated paraffin waxes or isocyanate prepolymers of, for example, hydrogenated castor oil or oxypropylated glycerol.

It is an object of the present invention to overcome the disadvantages described above and to provide novel aqueous isocyanate emulsions which will have the optimum working life and low reactivity with water even without the aid of additives.

These problems are solved by means of the emulsifiers of the instant invention.

DESCRIPTION OF THE INVENTION

This invention relates to emulsions comprising:
(a) 80 to 45% by weight, based on the whole emulsion, of water,
(b) 20 to 50% by weight, based on the whole emulsion, of an organic polyisocyanate and
(c) 1 to 10% by weight, based on the polyisocyanate, of a non-ionic surface active agent as emulsifier, characterized in that the emulsifier is a compound corresponding to the formula $$R-X(CH_2-CH_2-O)_n-CO-NH-Y,$$

wherein
X is selected from the group consisting of:

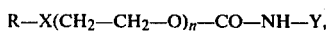

n is an integer from 10 to 50,
R' represents a $C_1$-$C_3$ alkyl group,
R represents a radical selected from the group consisting of an aromatic radical having 6 to 9 carbon atoms, a cycloaliphatic radical having 3 to 9 carbon atoms and a heterocyclic radical having from 2 to 9 carbon atoms in the ring, and
Y represents the group obtained by removal of an isocyanate group from an organic polyisocyanate, preferably from the polyisocyanate (b).

The invention also relates to the new emulsifiers corresponding to the above formula contained in the emulsions according to the invention.

The instant invention further relates to a process for the production of molded articles by hot molding of a mass of broken-down organic and/or inorganic raw material, using an aqueous emulsion of a compound containing isocyanate groups as binder, characterized in that the emulsions of the instant invention are used as binders.

The nonionic surface active agents corresponding to the formula $$R-X-(CH_2-CH_2-O)_n-CO-NH-Y,$$

wherein R, X, n and Y have the meaning indicated above which are contained in the polyisocyanate emulsions according to the invention may be prepared by the reaction of monofunctional alcohols of the general formula $$R-X-(CH_2-CH_2-O)_nH,$$

wherein R, X, and n are as defined above with polyisocyanates containing at least two isocyanate groups, at least one isocyanate group being used for each alcoholic hydroxyl group. The reaction products may then be dissolved in an excess of polyisocyanate, whereby water emulsifiable polyisocyanates ready for use are obtained.

It is preferred, however, to carry out the reaction of the above monohydric alcohol with a large excess of polyisocyanate, so that the emulsifiers according to the invention corresponding to the formula $$R-X-(CH_2-CH_2-O)_n-CO-NH-Y,$$

wherein R, X, n, and Y are as defined above, and are directly obtained in the form of a solution in excess polyisocyanate.

The monohydric alcohols corresponding to the formula $$R-X-(CH_2-CH_2-O)_n-H$$

are obtained in known manner by the ethoxylation of compounds of the formula $R-X-H$, wherein R, X, and n are as defined above.

The following are examples of preferred starters for the ethoxylation reaction: N-methylaniline, N-ethylaniline, cyclohexanol which may be substituted in the ring, phenol which may be substituted in the ring, thiophenol which may be substituted in the ring, glycidyl alcohol, 3-methyl-oxetane, 3-ethyl-oxetane, 3-butyl-oxetane, furfuryl alcohol, and tetrahydrofurfuryl alcohol.

The following are particularly preferred structures $R-X-$ in the monofunctional polyethylene oxide derivatives corresponding to the formula $$R-X(CH_2-CH_2-O)_n-H,$$

wherein R, X, and n are defined as above:

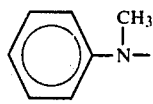

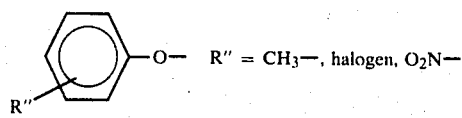
R'' = CH₃—, halogen, O₂N—

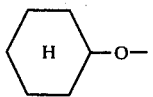

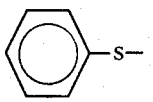

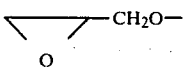

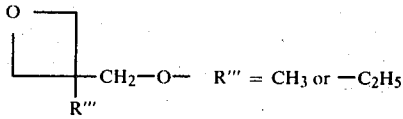
R''' = CH₃ or —C₂H₅

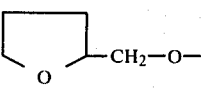

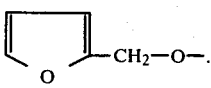

The number n in the formula R—X—(CH₂—CH₂—O)$_n$H is preferably chosen so that the molecular weight is in the range of 500 to 2500, and most preferably 700 to 2000. It therefore has an average numerical value of 10 to 50, preferably 15 to 40.

The alcohols of the formula —R—X—(CH₂—CH₂—O)$_n$H are reacted with polyisocyanates as described above, preferably in excess, to produce the surface active agents corresponding to the formula R—X—(CH₂—CH₂—O)$_n$—CO—NH—Y, wherein R, X, n and Y have the definitions indicated above. If the polyisocyanate has been used in excess, the products are advantageously obtained as solutions of the surface active agents of the instant invention in polyisocyanates. These solutions are generally clear and stable in storage but may, of course, be colored. This is always the case when the polyisocyanates used are crude products which have been obtained on a large commercial scale.

The reaction may be carried out, for example, by addition of the monohydric alcohol of the formula R—X—(CH₂—CH₂—O)$_n$H, wherein R, X, and n are as defined above, to the polyisocyanate with stirring. The alcohols used, which are in many cases waxy, should first be melted. When the preferred polyphenyl-polymethylene polyisocyanates are used, the reaction will take place at room temperature; although, it may, of course, be accelerated by heating, e.g., to temperatures of 50° to 100° C. Reaction temperatures in the range of 50° to 80° C. and reaction times of one to 5 hours have proven to be most suitable in practice.

To prepare the emulsions, the surface active, nonionic compounds corresponding to the formula R—X—(CH₂—CH₂—O)$_n$—CO—NH—Y and the polyisocyanates are mixed with the required quantity of water. The aqueous emulsions are in most cases readily formed and generally do not require exceptional shearing forces for their formation. They can be prepared by hand in a bucket, using a wooden blade as stirrer. The solution of the emulsifier in a polyisocyanate may be either stirred into water or conversely the water may be stirred into the polyisocyanate which has been rendered dispersible in water by means of the emulsifier of the instant invention.

On the commercial scale, the emulsions may, of course, be produced by mixing the starting components in special mixing apparatus such as static mixers, mixers with stirrer heads, dispersing machines and Supraton assemblies.

The isocyanate components used for the preparation of the emulsifiers of the instant invention may be aliphatic, cycloaliphatic, araliphatic, aromatic or heterocyclic polyisocyanates such as those described, for example, by W. Siefken in Justus Liebigs Annalen der Chemie 562, pages 75 to 136, for example, those corresponding to the formula Q(NCO)$_n$ wherein
n=2 to 4, preferably 2, and
Q represents an aliphatic hydrocarbon group having 2-18, preferably 6-10 carbon atoms; a cycloaliphatic hydrocarbon group having 4-15, preferably 5-10 carbon atoms; an aromatic hydrocarbon group having 6-15, preferably 6-13 carbon atoms or an araliphatic hydrocarbon group having 8-15, preferably 8-13 carbon atoms.

Examples of suitable isocyanates are, for example, ethylenediisocyanate; 1,4-tetramethylene-diisocyanate; 1,6-hexamethylene diisocyanate; 1,12-dodecane diisocyanate; cyclobutane-1,3-diisocyanate; cyclohexane-1,3-and-1,4-diisocyanate and any mixtures of these isomers. Also suitable are 1-isocyanato-3, 3,5-trimethyl-5-isocyanatomethyl cyclohexane (German Auslegeschrift No. 1,202,785; U.S. Pat. No. 3,401,190); 2,4- and 2,6-hexahydrotolylene diisocyanate and any mixtures of these isomers. Hexahydro-1,3-, and/or 1,4-phenylene diisocyanate; perhydro-2,4'- and/or 4,4'-diphenylmethane diisocyanate; 1,3- and 1,4-phenylene diisocyanate; and naphthylene-1,5-diisocyanate are also suitable isocyanates.

The following, for example, may also be used in this instant invention: triphenylmethane-4,4',4''-triisocyanate,polyphenyl-polymethylene polyisocyanates which can be obtained by aniline-formaldehyde condensation followed by phosgenation and which have been described, for example, in British Pat. Nos. 874,430 and 848,671; m- and p-isocyanatophenylsulfonyl-isocyanates according to U.S. Pat. No. 3,454,606;

perchlorinated arylpolyisocyanates such as those described, e.g., in German Auslegeschrift No. 1,157,601 (U.S. Pat. No. 3,277,138); and polyisocyanates with carbodiimide groups as described in German Pat. No. 1,092,007 (U.S. Pat. No. 3,152,162) and in German Offenlegungsschriften Nos. 2,504,400; 2,537,685; and 2,552,350. Norbornane diisocyanates according to U.S. Pat. No. 3,492,330; polyisocyanates with allophanate groups as described, e.g., in British Pat. No. 994,890; Belgian Pat. No. 761,626 and Netherlands Patent Application No. 7,102,524 and polyisocyanates with isocyanurate groups as described,e.g., in U.S. Pat. No. 3,001,973; German Pat. Nos. 1,022,789; 1,222,067; and 1,027,394 and in German Offenlegungsschriften Nos. 1,929,934 and 2,044,048 are also suitable. Additional suitable isocyanates are, for example, polyisocyanates with urethane groups as described, e.g., in Belgian Pat. No. 752,261 or U.S. Pat. Nos. 3,394,164 and 3,644,457; polyisocyanates with acylated urea groups according to German Pat. No. 1,230,778; polyisocyanates with biuret groups as described, e.g., in U.S. Pat. Nos. 3,124,605 and 3,201,372 and in British Pat. No. 889,050 and polyisocyanates prepared by telomerization reactions as described, e.g., in U.S. Pat. No. 3,654,106. Polyisocyanates with ester groups such as those mentioned in British Pat. Nos. 965,474 and 1,072,956; U.S. Pat. No. 3,567,763 and German Pat. No. 1,231,688; reaction products of the above-mentioned isocyanates with acetals according to German Pat. No. 1,072,385 and polyisocyanates containing polymeric fatty acid esters according to U.S. Pat. No. 3,455,883 are still further examples of suitable compounds.

The distillation residues still containing isocyanate groups from the commercial production of isocyanates may also be used, optionally as solutions in one or more of the above-mentioned polyisocyanates. Any mixtures of the above-mentioned polyisocyanates may also be used.

As a rule, it is particularly preferred to use commercially available polyisocyanates such as 2,4- and 2,6-tolylene diisocyanate and any mixtures of these isomers ("TDI"); polyphenyl-polymethylene polyisocyanates which may be prepared by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates"). Particularly preferred are those modified polyisocyanates which are derived from 2,4- and/or 2,6-tolylene diisocyanate or from 4,4'- and/or 2,4'-diphenylmethane diisocyanate.

Prepolymers carrying isocyanate end groups and having an average molecular weight of about 300 to 2000 such as those obtained in known manner by the reaction of relatively high molecular weight and/or low molecular weight polyols with an excess of polyisocyanate may also be used for the preparation of the emulsifiers in the instant invention. Particularly suitable relatively high molecular weight polyols are compounds which have 2 to 8 hydroxyl groups, especially those with a molecular weight in the range of 400 to 10,000, preferably 800 to 5000, e.g., the polyesters, polyethers, polythioethers, polyacetals, polycarbonates and polyester amides described below which have at least two, generally 2 to 8, preferably 2 to 4 hydroxyl groups, such as those known for the production of both homogeneous and cellulose polyurethanes.

Suitable polyesters with hydroxyl groups include, e.g., reaction products of polyhydric, preferably dihydric alcohols, to which trihydric alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms, and/or unsaturated.

Examples of such carboxylic acids and their derivatives are succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride and endomethylene tetrahydrophthalic acid anhydride. Glutaric acid anhydride; maleic acid; maleic acid anhydride; fumaric acid; dimerized and trimerized unsaturated fatty acids which may be mixed with monomeric unsaturated fatty acids such as oleic acid; dimethyl terephthalate and terephthalic acid-bis-glycol esters are also suitable for the instant invention. Examples of suitable polyhydric alcohols are ethylene glycol; propylene glycol-(1,2) and (1,3); butylene glycol-(1,4) and -(2,3); hexanediol-(1,6); octanediol-(1,8); neopentyl-glycol; 1,4-bis-hydroxymethylcyclohexane; 2-methyl-1,3-propanediol; glycerol; trimethylolpropane; hexanetriol-(1,2,6);butane-triol-(1,2,4); trimethylolethane and pentaerythritol. Additional examples are quinitol, mannitol; and sorbitol; formitol; methylglycoside; diethylene glycol; triethylene glycol; tetraethylene glycol and higher polyethylene glycols. Dipropylene glycol and higher polypropylene glycols; and dibutyl glycol and higher polybutylene glycols are also suitable. The polyesters may also contain a proportion of carboxyl end groups. Polyesters of lactones such as ε-caprolactone or hydroxycarboxylic acids such as ω-hydroxycaproic acid may also be used.

The polyethers used in the instant invention have at least two, generally 2 to 8, and preferably 2 to 3 hydroxyl groups. They are prepared, for example, by polymerization of epoxides either each on its own,e.g., in the presence of Lewis catalysts such as boron trifluoride,or by addition of these epoxides, preferably ethylene oxide and propylene oxide, either as mixtures or successively, to starting components having available hydrogen atoms. Examples of such starting compounds are water, alcohols, ammonia or amines, e.g., ethylene glycol, propylene glycol-(1,3) or (1,2), trimethylolpropane, glycerol sorbitol, 4,4'-dihydroxy diphenylpropane, aniline, ethanolamine or ethylene diamine. Examples of suitable epoxides are ethylene oxide, propylene oxide, butylene oxide, tetrahydrofuran, styrene oxide and epichlorohydrin. Sucrose polyethers may also be used, e.g., those described in German Auslegeschriften Nos. 1,176,358 and 1,064,938, as well as polyethers started on formitol or formose (German Offenlegungsschriften Nos. 2,639,083 and 2,737,951). In many cases it is preferred to use polyethers which contain predominantly primary hydroxyl groups (up to 90% by weight, based on all the hydroxyl groups present in the polyether). Polybutadienes which have hydroxyl groups are also suitable for use in the instant invention.

Particularly preferred among the polythioethers are the condensation products obtained by reacting thiodiglycol on its own and/or with other glycols, dicarboxylic acids, formaldehyde, aminocarboxylic acids or amino alcohols. The products obtained are polythio mixed ethers polythio ether esters or polythio ether ester amides, depending on the other components.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the instant invention may also be prepared by the polymerization of cyclic acetals, e.g., trioxane (German Offenlegungsschrift No. 1,694,128).

Suitable polycarbonates with hydroxyl groups may be of the kind known per se, for example, those which can be prepared by the reaction of diols such as propanediol-(1,3), butanediol-(1,4) and/or hexanediol-(1,6), diethylene glycol, triethylene glycol, tetraethylene glycol or thiodiglycol with diarylcarbonates, e.g., with diphenylcarbonate or phosgene (German Auslegeschriften Nos. 1,694,080; 1,915,908; and 2,221,751 and German Offenlegungsschrift No. 2,605,024).

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil or carbohydrates, e.g., starch, may also be used. Addition products of alkylene oxides and phenolformaldehyde resins or of alkylene oxides and urea formaldehyde resins are also suitable for use in the instant invention.

Suitable low molecular weight polyols (molecular weight 62 to 400) include, for example, the compounds mentioned above as starting components for the preparation of relatively high molecular weight polyols.

The isocyanate components used for the emulsions of the instant invention may be any of the polyisocyanates mentioned above in connection with the preparation of the emulsifiers, provided that they are liquid at the processing temperatures, in particular at room temperature. The isocyanate components are preferably identical since, as mentioned above, the emulsifier is prepared "in situ" in the polyisocyanate by the introduction of the monohydric alcohol which carries ethylene oxide units.

The instant emulsions are preferably used as binders for materials containing lignocellulose, as already mentioned. Emulsions which have proved to be particularly suitable for this purpose are those in which the isocyanate component (see German Offenlegungsschrift No. 2,711,958) is the phosgenation product for the undistilled bottom fractions. These may be obtained, for example, by the removal of 25 to 90% by weight, preferably 30 to 85% by weight of 2,2'-, 2,4'- and/or 4,4'-diaminodiphenylmethane from an aniline/formaldehyde condensate. The undistilled bottom fraction may also be obtained by the removal of 25 to 90% by weight, preferably 30 to 85% by weight of 2,2'-, 2,4'- and/or 4,4'-diisocyanatodiphenylmethane from the crude phosgenation product of an aniline/formaldehyde condensate. In either case, the isocyanate component should contain 35 to 70% by weight, preferably 45 to 60% by weight of diisocyanatodiphenylmethane. The 2,4'-diisocyanatodiphenylmethane content is from 1 to 8% by weight, preferably from 2 to 5% by weight and the content of 2,2'-diisocyanatodiphenylmethane is from 0 to 2% by weight. In either case, the isocyanate component has a viscosity at 25° C. of 50 to 600 mPas, preferably 200 to 500 mPas, and an isocyanate content from 28 to 32% by weight.

It will be clear from what has been said above that such bottom fractions may be obtained, for example, by the removal of 45 to 90% by weight, preferably 55 to 85% by weight of 4,4'-diisocyanatodiphenylmethane from a crude diphenylmethane diisocyanate which contains more than 85% by weight, preferably more than 90% by weight of 4,4'-diisocyanatodiphenylmethane. A crude diphenylmethane diisocyanate of this type may be obtained, for example, by the process of German Offenlegungsschrift No. 2,356,828.

Such bottom fractions may also be obtained from a crude phosgenation product containing 60 to 90% by weight, preferably 65 to 75% by weight of diisocyanatodiphenylmethane isomers in which the 2,4'-isomers content is 20 to 60% by weight, preferably 30 to 40% by weight, by distilling off 25 to 80% by weight, preferably 30 to 60% by weight of 2,4'-diisocyanatodiphenylmethane and optionally 4,4'- or 2,2'-diisocyanatodiphenylmethane.

The distillation may in all cases be carried out in such a manner that the residue has the composition indicated above.

The desired composition of isomers and oligomers in the polyisocyanate mixture may, of course, also be obtained by mixing different bottom fractions, and in many cases this is the simplest approach in practice.

Examples of suitable lignocellulose-containing raw materials which may be bound with the instant emulsions include wood, wood bark, cork, bagasse, straw, flax, bamboo, alfa grass, rice husks, sisal fiber and coconut fiber. The material may be in the form of granules, chips, fibers or powder and may have a water content of, e.g., 0 to 35% by weight, preferably 5 to 25% by weight. The binder used in the instant invention is added in a quantity of 1 to 100% by weight, preferably 2 to 12% by weight and the material is molded into board or shaped products, generally with the application of heat and pressure.

Molded products may, of course, also be obtained in the instant invention from other organic raw materials (e.g., plastic waste of all types) and/or inorganic raw materials (e.g., expanded mica or silicate pebbles).

To carry out the instant process, the material which is required to be molded is mixed with the binder, preferably by spraying it with the aqueous emulsion so that very homogeneous distribution is obtained. It has been found that the aqueous emulsions of this instant invention have a sufficiently low viscosity so that they can be sprayed with isocyanate contents of up to 50% while the solutions of urea/formaldehyde and phenol/formaldehyde resins normally used for the production of molded board and similar materials can generally only be sprayed if they have solids contents below 40%. The invention therefore provides a process in which less water may be used than previously. Therefore, less water need be removed during the subsequent state of molding under heat and pressure and the subsequent conditioning. Furthermore, the lignocellulose material need not be dried before it is mixed with the binder.

It has furthermore been found that in the instant process, molding may effectively be carried out at temperatures below 100° C. (e.g. at 90° to 95° C.) instead of at the temperatures of 150° to 220° C. which are normally required when urea/formaldehyde or phenol/formaldehyde resins are used. Such low temperatures save energy and are environmentally advantageous because they help prevent the formation of fumes and vapors.

Another advantage is that the low temperature prevents the formation of vapor bubbles which are liable to occur within boards of molded articles at high temperatures. This is particularly important for the production of laminates with impermeable surfaces. It is therefore also possible to obtain a better seal in the molding process since it is no longer necessary to provide for sufficient permeability for the escape of vapor.

The instant process may, of course, also be carried out at the usual, more elevated temperatures. This may in some cases be desirable in that it may shorten the time required for hardening and the molded products can be more easily removed from the molds.

Periods of delay may occur in practice between various stages of the process (i.e., preparation of the emulsion and/or spraying of the material to be used). Delays may also occur due to faults in operation or to the need to readjust the operating conditions. However, the reaction between the isocyanates and water in the instant emulsions proceeds sufficiently slowly so that a delay of at least two hours can be tolerated between preparation of the emulsion and the molding process. The reaction velocity may be slowed down even further by using only the minimum quantity of surface active agents. Another method of slowing down the reaction lies in controlling the reactivity of the polyisocyanates towards water. Thus, for example, the reaction velocity may be considerably reduced by increasing the proportion of 2,4'- and/or 2,2'- diphenylmethane diisocyanate.

Multilayered boards or molded products may be produced analogously from veneers, paper or woven fabrics. Multilayered boards or molded articles may also be produced from veneers and middle layers of strips, rods or bars, so-called carpentry board, by treating the veneers with the polyisocyanate emulsion as described above and then molding them together with the middle layers, generally at an elevated temperature and pressure. Temperatures in the range of 100° to 250° C. are preferably employed, particularly 130° to 220° C. The initial pressure is in this case also preferably in the range of 5 to 150 bar but the pressure in most cases drops towards zero during the molding process.

The polyisocyanate emulsions may also be used in combination with the polyhydroxyl compounds described above, using an NCO/OH ratio in the range of 1:2 to 10:1, preferably 1.5:1 to 1:1. The two components may be used separately or as a reactive mixture. Such combinations of polyisocyanates and polyhydroxyl compounds are of practical importance as binders, e.g., for binding cork granules. Known blowing agents may be added in a quantity of about 0.5 to 30% by weight, based on the quantity of binder or impregnating agent. Other additives such as stabilizers, catalysts and activators which influence the formation of foam or the chemical reaction between polyisocyanates, lignocellulose-containing material and possibly also the polyhydroxyl compounds may also be added in a quantity of 0.05 to 10% by weight, based on the quantity of binder or impregnating agent.

The polyisocyanate emulsions used as binders in the instant invention may also be combined with the aqueous solutions of urea-formaldehyde and/or melamine-formaldehyde and/or phenol-formaldehyde condensation products which have been predominantly used in the manufacture of timber products. Also, they may be combined with other less common binders and impregnating agents, e.g., sulfite waste liquors or tannin. The binders of the instant invention may be mixed with these additional binders in proportions ranging from 1:10 to 10:1, preferably from 1:5 to 5:1. The polyisocyanate emulsion and additional binder may be added either separately or as a mixture.

Such combinations are particularly advantageous for the production of multilayered boards which are required to have special properties. Thus, for example, conventional adhesives (alone or together with the polyisocyanate emulsion) may be added to the outermost layers and the polyisocyanate emulsions of the instant invention (alone or together with conventional adhesives) may be added to one or more of the inner layers before the different layers are molded together.

Owing to their outstanding mechanical properties, the boards or other molded articles produced by the instant process on the basis of lignocellulose-containing or other organic and/or inorganic raw materials are particularly suitable for use in the building sector. The boards or molded articles may be endowed with the necessary resistance to molds, insects and fire by adding the usual organic or inorganic protective agents to the binders either in the pure form or as solutions in quantities of about 0.05 to 30% by weight, preferably 0.5 to 20% by weight, based on the whole material. The following solvents may be used: water or organic solvents such as residual oils from processing of petroleum hydrocarbons, chlorinated hydrocarbons and the like. These solvents generally do not impair the bonding quality. In contrast to boards bonded with phenol/formaldehyde resins, the materials manufactured by the instant process are advantageously free from any phenomena of efflorescence of salts or "bleeding."

Due to the high bonding power of the binders of the instant invention, molded products impregnated or bonded with these binders frequently tend to stick to the surface of hot presses or molds. This can be overcome by adding mold release agents to the isocyanate emulsions. Alternatively, the mold release agents may be applied, either pure or as solutions, to the metallic surfaces with which the molded products come into contact or to the surface of the molding. Any known substances previously proposed as mold release agents may be used for this purpose although it is preferred to use the compounds according to German Offenlegungsschrift No. 2,325,926 which catalyze the formation of isocyanurates from isocyanates. Examples of these are phenol-Mannich bases, derivatives of hexahydrotriazine or alkali metal salts of carboxylic acids. As already mentioned above, substantial improvements both in the mechanical properties and from a processing point of view can be obtained by using the isocyanate emulsion in the instant invention for the production of chipboard instead of using the usual binders based on phenol/formaldehyde resins or urea/formaldehyde resins. In the case of wood chipboard, for example, the flexural strength can be increased by up to 50% by using the same quantity of binder, in addition to improving other mechanical properties. Alternatively, equal mechanical properties can be obtained where the concentration of binder is reduced by about 25 to 70%. These optimum results in the finished material are obtained particularly if the binder used is a polymethylene-polyphenyl polyisocyanate having the viscosity and distribution of isomers specifically defined above.

It is immaterial whether the polyisocyanate mixture has been prepared by the removal of 2,4'- and/or 4,4'-diisocyanatodiphenylmethane from the crude diphenylmethane diisocyanate by distillation or whether it has been obtained analogously by the removal of pure diaminodiphenylmethane from crude diaminodiphenylmethane followed by phosgenation of the resulting undistilled bottom fraction of polyarylamines.

If the polyisocyanate contains more than 75% by weight of diisocyanatodiphenylmethanes, the physical properties of the chipboard are generally inferior. If, on the other hand, the diisocyantodiphenylmethane content falls below 35% by weight, the binder generally becomes too highly viscous at room temperature and is difficult to emulsify.

The following examples serve to illustrate the invention without restricting it in any way. Data is given in parts by weight or percentages by weight unless otherwise indicated.

Polyisocyanates used as starting materials

I. Diisocyanatodiphenylmethane is distilled off a crude phosgenation product of an aniline/formaldehyde condensate until the distillation residue has a viscosity at 25° C. of 100 cP (dinuclear content: 59.7%; trinuclear content: 21.3%, proportion of higher nuclear polyisocyanates: 19.0%).

II. Similarly prepared polyisocyanate having a viscosity at 25° C. of 200 cP (dinuclear content: 45.1%; trinuclear content: 23.5%; proportion of higher nuclear polyisocyanates: 32.2%).

III. Similarly prepared polyisocyanate having a viscosity at 25° C. of 400 cP (dinuclear content: 45.1%; trinuclear content: 22.3%; proportion of higher nuclear polyisocyanates: 32.6%).

IV. Analogously prepared polyisocyanate having a viscosity of 300 cP/25° C. Dinuclear content: 60%; isocyanate content 30%.

V. Product analogous to IV with a dinuclear content of 60%; NCO content 30.9%; viscosity 230 cP/25° C.; functionality about 2.7.

VI. Product analogous to IV but with a dinuclear content of 70%; NCO content 30.0%; viscosity 190 cP/25° C.; functionality about 2.5.

TABLE 1

| Compound | Starting compounds corresponding to the formula R—X—(CH$_2$—CH$_2$—O)$_n$H | OH number | Molecular weight |
|---|---|---|---|
| A | Ethoxylated N—methylaniline | 56 | 1000 |
| B | Ethoxylated N—methylaniline | 87 | 645 |
| C | Ethoxylated cyclohexanol | 57 | 990 |
| D | Ethoxylated 3-ethyl-3-hydroxymethyloxetane | 75 | 750 |
| E | Ethoxylated 3-ethyl-3-hydroxymethyloxetane | 47 | 1192 |
| F | Ethoxylated 3-methyl-3-hydroxymethyloxetane | 56 | 1000 |
| G | Ethoxylated phenol | 67 | 835 |
| H | Ethoxylated phenol | 48 | 1165 |
| I | Ethoxylated furfuryl alcohol | 26 | 2150 |
| K | Ethoxylated thiophenol | 42 | 1500 |
| L | Ethoxylated tetrahydrofurfuryl alcohol | 48 | 1165 |
| X | Comparison compound ethoxylated Alfol* | 49 | 1140 |
| Y | Comparison compound ethoxylated oleyl alcohol** | 79 | 708 |
| Z | Comparison compound ethoxylated nonyl phenol*** | 50 | 1111 |

TABLE 1-continued

| Compound | Starting compounds corresponding to the formula R—X—(CH$_2$—CH$_2$—O)$_n$H | OH number | Molecular weight |
|---|---|---|---|
| | ated nonyl phenol*** | | |

*"Alfol" is a commercial mixture of saturated $C_{12}$-$C_{18}$ monohydric alcohols.
**Identical to emulsifier O-10 of Bayer AG
***Identical to emulsifier NP-20 of Bayer AG

EXAMPLE 1

130 g of compound A (liquefied by melting at 55° C.) are added all at once to 1870 g of polyisocyanate I used as starting material at 40° C. under nitrogen in a 3-liter beaker equipped with stirrer and reflux condenser. The temperature of the reaction mixture is raised to 65° C. after 15 minutes and maintaining at this level for 3 hours. After cooling to room temperature, there is obtained a clear, brown solution of nonionic surface active agent of the instant invention represented by the following idealized formula

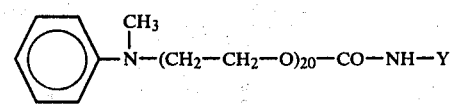

in excess polyisocyanate I.

The ethoxylated N-methylaniline content is 7%, the viscosity 155 cP and the isocyanate content 28.24%.

Aqueous polyisocyanate emulsions in the instant invention are obtained in the form of white, thin liquids from the reaction product by the following methods:

(a) 140 ml of water are added to 60 g of the emulsifier-containing polyisocyanate in a glass beaker and the mixture is stirred with a glass rod. After about 2 minutes, the whole material has been converted into a white, highly fluid O/W type of emulsion. Its solids content is 30%.

(b) The reverse procedure is employed, i.e., 140 ml of water are introduced into the glass beaker and 60 g of the polyisocyanate which contains emulsifier are added with stirring, using a glass rod. A white, highly fluid O/W type of emulsion is again obtained.

(c) 120 g of the polyisocyanate containing emulsifier are introduced into a 1-liter cardboard cup. 180 ml of water are added in the course of 10 seconds with stirring, using a pendraulic stirrer (ca. 800 revs/min). from Maschinen und Apparate GmbH (Germany) which is a turbine-type agitator for lab-scale experiments. A finely divided whitish, highly fluid emulsion is obtained after only 30 seconds. Its solids content is 40%. The emulsion is somewhat more finely divided than (a) and (b).

EXAMPLES 2-20

The materials of Examples 2 to 20 were obtained by procedures completely analogous to those of Example 1 from the starting compounds A to L and the polyisocyanates I to VI. Table 2 below shows the quantitative proportions of the starting components, the reaction conditions (temperature, time) and the properties of the end products (% by weight NCO, viscosity).

All products yielded white, finely divided, highly fluid emulsions. 60 g of the materials from Examples 2 to 20 were in each case mixed with 140 g of water in the course of 30 seconds, using a pendraulic stirrer at about 1000 revs/min. All the emulsions from Examples 2 to 20 had a solids content of 30%.

TABLE 2

R—X—(CH$_2$—CH$_2$—O)$_n$H

| Example | Type | Quantity (based on polyisocyanate) | Polyisocyanate | % NCO | Viscosity /23° C. (cP) |
|---|---|---|---|---|---|
| 2 | F | 5% | II | 29.1 | 180 |
| 3 | A | 5% | II | 27.8 | 400 |
| 4 | A | 10% | II | 26.2 | 450 |
| 5 | B | 10% | II | 26.1 | 500 |
| 6 | H | 5% | II | 27.9 | 500 |
| 7 | H | 10% | II | 26.2 | 550 |
| 8 | G | 5% | II | 27.8 | 400 |
| 9 | L | 5% | II | 29.4 | 110 |
| 10 | D | 5% | II | 29.0 | 120 |
| 11 | E | 5% | IV | 28.0 | 330 |
| 12 | E | 5% | II | 28.8 | 250 |
| 13 | E | 5% | V | 27.9 | 150 |
| 14 | E | 5% | VI | 27.6 | 100 |
| 15 | C | 5% | II | 27.6 | 150 |
| 16 | J | 5% | I | 28.6 | 140 |
| 17 | K | 7% | I | 28.1 | 175 |
| 18 | J | 6% | III | 28.0 | 440 |
| 19 | E | 10% | IV | 25.9 | 500 |
| 20 | D | 10% | IV | 26.5 | 450 |

| Example | Temp (°C.) | Time (h) |
|---|---|---|
| 2 | 80 | 1 |
| 3 | 50 | 3 |
| 4 | 50 | 3 |
| 5 | 60 | 2 |
| 6 | 60 | 2 |
| 7 | 60 | 2 |
| 8 | 50 | 2 |
| 9 | 40 | 5 |
| 10 | 50 | 3 |
| 11 | 50 | 4 |
| 12 | 60 | 3 |
| 13 | 50 | 3 |
| 14 | 50 | 3 |
| 15 | 60 | 3 |
| 16 | 60 | 3 |
| 17 | 60 | 3 |
| 18 | 55 | 4 |
| 19 | 50 | 3 |
| 20 | 50 | 3 |

EXAMPLE 21

20 g of compound E are added all at once to 380 g (2.184 mol) of tolylene diisocyanate (2,4/2,6-isomer ratio 80:20). The reaction mixture is then heated to 70° C. with stirring for 2 hours.

A clear solution of an emulsifier according to the instant invention in excess tolylene diisocyanate is obtained quantitatively.

| Isocyanate calculated: | 45.69% |
|---|---|
| Isocyanate found: | 45.67% |
| Viscosity: | about 20 mPas/20° C. |

A finely divided, white emulsion is obtained by either adding 70 parts of distilled water to 30 parts of the product with stirring, using a pendraulic stirrer (about 1000 revs/min) or conversely adding the product to water.

EXAMPLE 22

55 parts of the product from Example 3 are emulsified in 165 parts of water within 30 seconds, using a pendraulic stirrer at 1000 revs/min.

2900 g of industrially produced softwood shavings having a water content of 6% are then sprayed with the emulsion in a laboratory sizing machine, using two-component nozzles for fluidized material, and the resulting mixture is used to produce a molding on a steel sheet which has previously been treated with an aqueous potassium acetate/diethylene glycol solution, and the surface of the molding is also wetted with the solution of mold parting agent. After a molding time of 3.2 minutes at a hot plate temperature of 170° C. and a molding pressure of 25 bar which is reduced to 5 bar after one-third of the molding time, a chipboard having a transverse tensile strength of 0.74 mPa is obtained.

EXAMPLE 23

2000 g of industrially manufactured middle layer chips having a water content of 6% are mixed with 114 g of an emulsion consisting of 76 g of water and 38 g of product from Example 6, which emulsion has been prepared in a stirrer mixing head immediately before sizing. In addition, 1000 g of top layer chips having a solids content of 8% are sprayed with 204 g of a 50% aqueous urea-formaldehyde resin solution (equivalent ratio 1:1.3).

A three-layered laminate is formed from top layer and middle layer chips on an aluminum sheet and molded in a laboratory press as indicated in Example 22 to produce a chip board having a transverse tensile strength of 0.75 mPa.

EXAMPLE 24

An emulsion of 143 g of water, 17 g of potassium bifluoride Basilit SP of Desowag-Bayer-Holzschutz GmbH, 29 g of 50% paraffin dispersion Mobilcer 161 of Mobil Oil AG and 143 g of the product from Example 11 is prepared manually by stirring with a wooden rod in a 500 ml glass beaker and the emulsion is used to wet 2950 g of an industrially produced mixture of 50% of softwood shaving and 50% of hardwood shavings as indicated in Example 22. A molding is produced from this mixture between two pinewood veneers, each 1.5 mm in thickness used as surface layers, and the laminate is hardened as described in Example 22. A decorative, fungus-resistant chipboard is obtained which has a high flexural strength in the direction of the fibers of the veneer, a V-20 transverse tensile strength of 1.05 mPa and a V 100 transverse tensile strength of 0.24 mPa.

COMPARISON EXAMPLES 1–3

50 g of the comparison compounds, X, Y, and Z, respectively, were reacted in each case with 950 g of the starting polyisocyanate II at 60° C. for 3 hours. Clear, brown solutions containing 5% of emulsifier were obtained in each case.

| Solution | Monohydric alcohol | % NCO | (cP) |
|---|---|---|---|
| 1 | X | 28.7 | 100 |
| 2 | Y | 28.4 | 130 |
| 3 | Z | 28.7 | 120 |

30 g of the comparison products 1–3 were mixed in each case with 70 ml of water with stirring. *In no case was a white, stable emulsion obtained.* The material was pale brown and had the appearance of being "curdled." It separated with formation of a second, brown phase within 2 to 5 minutes. Comparison products 1 to 3 which are not within the parameters of the invention are therefore unusable.

What is claimed is:
1. Emulsions comprising:
   (a) 80 to 45% by weight, based on the whole emulsion of water,
   (b) 20 to 50% by weight, based on the whole emulsion, of an organic polyisocyanate and
   (c) 1 to 10% by weight, based on the polyisocyanate of a nonionic surface-active agent as emulsifier characterized in that said emulsifier (c) is a compound comprising:

$$R-X-(CH_2-CH_2-O)_n-CO-NH-Y,$$

wherein
   X is selected from the group consisting of $$-O-, -\overset{R'}{\underset{|}{N}}-, -CH_2-O- \text{ or } -S-,$$

n represents a number from 10 to 50,
   R' represents a $C_1-C_3$ alkyl group,
   R represents a radical selected from the group consisting of an aromatic radical having 6 to 9 carbon atoms, a cycloaliphatic radical having 3 to 9 carbon atoms and a heterocyclic radical having from 2 to 9 carbon atoms in the ring, and
   Y represents a group obtained by removal of an isocyanate group from an organic polyisocyanate.

2. An emulsion as claimed in claim 1, wherein component (b) is the phosgenation product of the undistilled bottom fraction obtained by removal of from 25 to 90% by weight of 2,2'-,2,4'- and/or 4,4'-diaminodiphenylmethane from an aniline/formaldehyde condensate, component (b) further characterized as containing from 35 to 70% by weight of diisocyanatodiphenylmethane, of which from 1 to 8% by weight is 2,4'-diisocyanatodiphenylmethane and 0 to 2% by weight is 2,2'-diisocyanatodiphenylmethane, and having a viscosity at 25° C. of from 50 to 600 mPas and an isocyanate content in the range of from 28 to 32% by weight.

3. An emulsion as claimed in claim 1, wherein component (b) is the phosgenation product of the undistilled bottom fraction obtained by the removal of from 25 to 90% by weight of 2,2'- 2,4'- and/or 4,4'-diisocyanatodiphenylmethane from the crude phosgenation product of an aniline/formaldehyde condensate, component (b) further characterized as containing from 35 to 70% by weight of diisocyanatodiphenylmethane, of which from 1 to 8% by weight is 2,4'-diisocyanatodiphenylmethane and from 0 to 2% by weight is 2,2'-diisocyanatodiphenylmethane, and having a viscosity at 25° C. of from 50 to 600 mPas and an isocyanato content in the range of from 28 to 32% by weight.

4. An emulsion as claimed in claim 1, wherein component (b) is a polyisocyanate which has been obtained as the bottom fraction by removal by distillation of from 45 to 90% by weight of 4,4'-diphenylmethane diisocyanate from a crude diphenylmethane diisocyanate containing more than 85% by weight of pure diphenylmethane diisocyanate.

5. An emulsion as claimed in claim 1, wherein component (b) is a polyisocyanate which has been prepared by phosgenation of an undistilled bottom fraction such as is obtained by removal of from 45 to 90% by weight of 4,4'-diaminodiphenylmethane from a crude diaminodiphenylmethane containing more than 85% by weight of pure diaminodiphenylmethane.

6. An emulsion as claimed in claim 1, wherein component (b) is a polyisocyanate which has been obtained as bottom fraction by removal by distillation of from 25 to 80% by weight of 2,4'-and optionally 4,4'-diisocyanatodiphenylmethane from a crude diphenylmethane diisocyanate containing from 60 to 90% by weight of diisocyanatodiphenylmethane isomers comprising from 20 to 60% by weight of 2,4'-isomers.

7. An emulsion as claimed in claim 1, wherein component (b) is a polyisocyanate which has been prepared by phosgenation of an undistilled bottom fraction obtained by distillation of from 25 to 80% by weight of 2,4'-and optionally 4,4'-diaminodiphenylmethane from crude diaminodiphenylmethane containing from 60 to 90% by weight of pure diaminodiphenylmethane comprising from 20 to 60% by weight of 2,4'-diaminodiphenylmethane.

8. An emulsion according to claim 1, wherein component (c) is prepared by the reaction of monofunctional alcohols of the general formula $$R-X-(CH_2-CH_2-O)_nH,$$

wherein R, X and n are as defined in claim 1, with polyisocyanates containing at least two isocyanate groups, at least one isocyanate group being used for each alcoholic hydroxyl group.

9. An emulsion according to claim 8, wherein said monofunctional alcohol comprises a compound taken from the group consisting of ethoxylated N-methylaniline, ethoxylated cyclohexanol, ethoxylated 3-ethyl-3-hydroxymethyloxetane, ethoxylated 3-methyl-3-hydroxymethyloxetane, ethoxylated phenol, ethoxylated furfuryl alcohol, ethoxylated thiophenol and ethoxylated tetrahydrofurfuryl alcohol.

10. An emulsion according to claim 1, wherein component (c) is prepared by the reaction of monofunctional alcohols of the general formula $$R-X-(CH_2-CH_2-O)_nH,$$

wherein R, X and n are as defined in claim 1, with a great excess of polyisocyanates of component (b), one isocyanate group being used for each alcoholic hydroxyl group.

11. An emulsion according to claim 10, wherein said monofunctional alcohols have the idealized formula

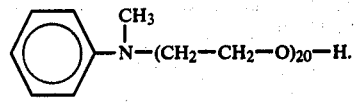

12. An emulsion according to claim 10, wherein said monofunctional alcohols have the idealized formula

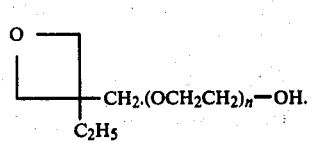

* * * * *